United States Patent

[11] 3,607,965

[72] Inventors John R. Coleman, Jr.
Littleton;
David W. Hall, Englewood; Frank L.
Dormish, Denver, all of Colo.
[21] Appl. No. 861,108
[22] Filed Sept. 25, 1969
[45] Patented Sept. 21, 1971
[73] Assignee Marathon Oil Company
Findlay, Ohio

[54] DIOLEFINS FROM CHLOROETHERS
10 Claims, 1 Drawing Fig.
[52] U.S. Cl. ................................................. 260/681,
260/616
[51] Int. Cl. ..................................................... C07c 1/20,
C07c 41/12

[50] Field of Search ........................................... 260/681

[56] References Cited
UNITED STATES PATENTS
3,360,583 12/1967 Hall et al. ..................... 260/681
3,377,405 4/1968 Hurley et al. ................. 260/681

Primary Examiner—Delbert E. Gantz
Assistant Examiner—G. E. Schmitkons
Attorneys—Joseph C. Herring, Richard C. Willson and Jack L. Hummel ABSTRACT: In the production of diolefins by reaction of a halo ether and an olefin followed by cracking hydrogen halide and alcohol from the intermediate adduct, olefin ethers are formed in the cracking reactor and are isolated by conventional distillation and recycled to the cracking reactor to be converted to diolefins and alcohol.

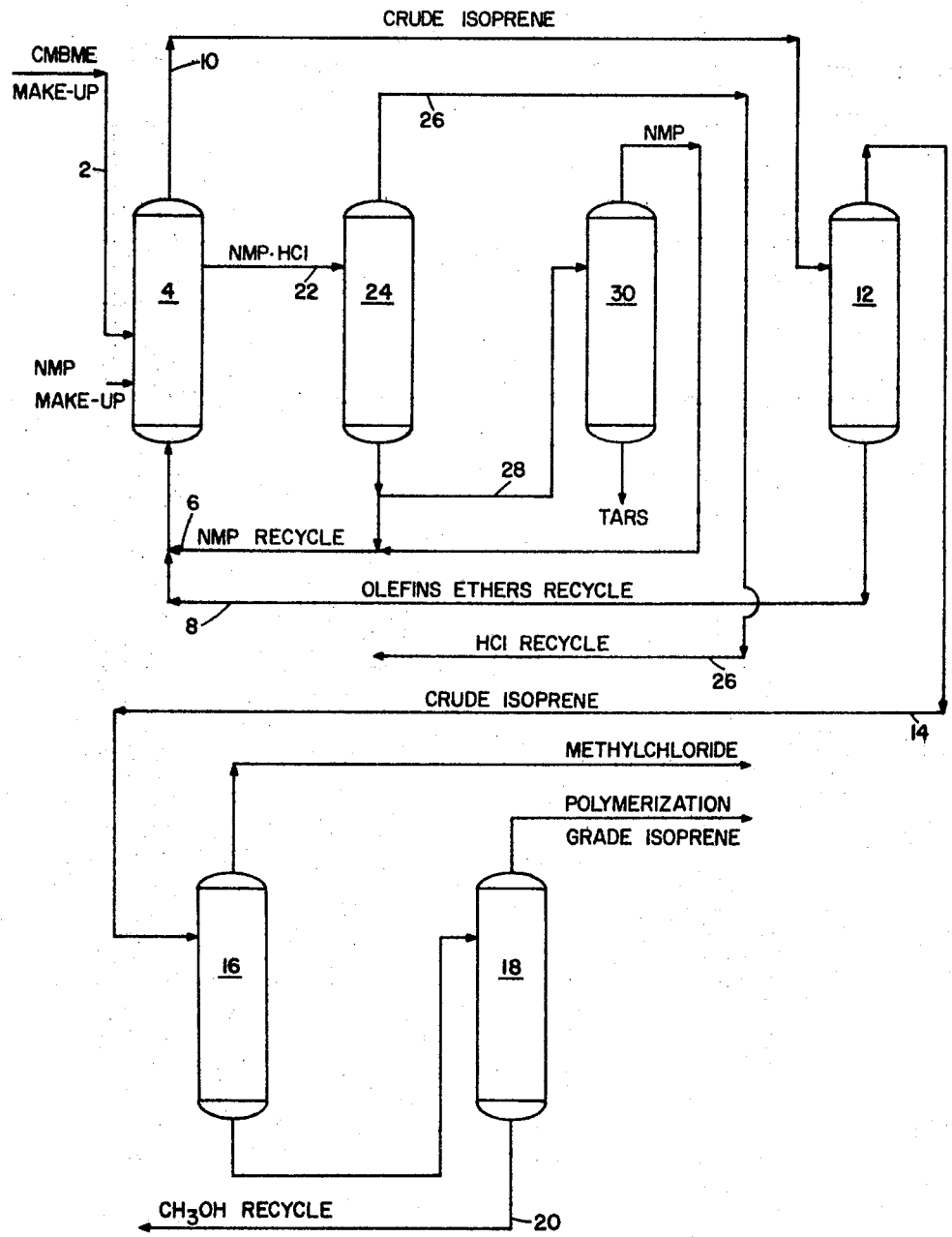

DIOLEFINS FROM CHLOROETHERS

SUMMARY OF THE INVENTION

This invention relates to the production of diolefins, e.g., the process described in U.S. Pat. No. 3,360,583. In the process of that patent, conjugated dienes are prepared by reacting alpha halo ethers with olefins and splitting out a hydrogen halide and alcohol from the resulting halo ether adduct. The patent broadly sets forth useful starting materials and reaction conditions for the process. In general, the halo ethers are substituted in the alpha position with chloro, bromo, or iodo and are methyl, ethyl, or propyl symmetrical or unsymmetrical alphahalo ethers. Examples include: bis (chloromethyl) ether, dichloromethyl methyl ether, and chloromethyl methyl ether. The reactive olefins are also broadly set forth and include halogen-substituted olefins. Examples of olefins include allyl chloride, 1-butene, isobutylene, and preferably olefins having from 2 to 9 carbon atoms. A petroleum fraction containing a mixture of olefins, such as a $C_4$ fraction, is also useful in the process. The adduction of the haloether to the olefin is generally carried out in the presence of a Friedel-Crafts catalyst at a temperature of $-30°$ to $70°C$, preferably from $5°$ to $35°$. Once the halo ether adduct has been prepared by reaction of the alpha halo ether with the olefin in the presence of a catalyst, the halo ether adduct is pyrolyzed at from $90°$ to $350°C$., preferably from $120°$ to $180°C$. to form a desired conjugated polyene. This pyrolysis reaction is advantageously carried out in the presence of a basic tertiary amide solvent, such as N-methyl-2-pyrrolidone. In general, the solvents contain nitrogen and have base or dissociation constants ($K_b$) of less than about $1 \times 10^{110}$, preferably between $10^{111}$ and $10^{118}$, as measured in aqueous solutions at $20-25°C$. In the alternative, the pyrolysis or cracking operation may desirably be conducted in the presence of a suitable molecular sieve catalyst.

Conjugated diolefins, trienes, and higher polyenes, made in accordance with the above process have found increasing use in the elastomer and insecticide industries. A particularly preferred product is isoprene, a valuable monomer in the production of polyisoprene for use in the rubber industry.

The present invention is essentially an improvement of the process described in U.S. Pat. No. 3,360,583, described above. In that process, up to 100 percent conversions are obtained when relatively severe operating conditions, e.g., high pyrolysis temperatures, are employed. However, to protect the desired polyolefin product, it is often necessary to employ milder operating conditions, with the result that pyrolysis of the intermediate adduct is incomplete. Rather, a class of materials known as "olefin ethers" is produced by the partial cracking of the intermediate adduct. The splitting of the hydrogen halide is essentially complete, but the splitting of the alcohol is not always complete, producing the olefin ether byproduct. The conjugated diene-product mixture will contain generally from about 1 to up to 10 weight percent of these olefin ethers, which comprise an unwanted byproduct as well as a loss of valuable reactants.

SUMMARY OF THE INVENTION

We have found that by distillation methods the olefin ethers may be recovered separately from the product mixture. Recycling the olefin ethers back to the cracking reactor converts them to the desired conjugated diene product. In this manner, the overall conversion of reactants to desired diene products is greatly enhanced in a continuous type process.

PREFERRED EMBODIMENTS OF THE INVENTION

In a particular embodiment of the invention, in the preparation of isoprene, reference is made to the accompanying drawings, wherein:

The figure is a continuous process flow diagram for the production of isoprene using N-methyl-pyrrolidone (NMP) as the cracking solvent.

Referring to the figure, 3-chloro-3-methylbutyl methylether CMBME), prepared by reaction of chloromethyl methylether with isobutylene in the presence of titanium tetrachloride, identified as stream 2 is charged to cracking reactor 4. The feed to the cracking reactor includes cracking solvent NMP, recycled NMP 6, and recycled olefin ethers 8. The reaction is carried out at $230°F$. The reaction rate may be enhanced by including metal halide catalysts in reactor 4, such as zinc chloride and lithium chloride. Overhead temperature of reactor 4 is controlled at $150°F$. Most of the partially cracked olefin ethers condense and flow back into the reactor, while isoprene and methyl alcohol escape in overhead stream 10. At least about 1 and up to about 10 weight percent of overhead stream 10 include the partially cracked olefin ethers, which consist mostly of 3-methyl-3-butenyl methylether and 3methyl-2-butenyl methylether.

Overhead stream 10 containing isoprene together with methyl alcohol, any tertiary butyl chloride passing through the cracking reactor unchanged, methyl chloride, olefin ethers, and some unreacted isobutylene enters product separation column 12 (a conventional distillation column) where the more volatile components are stripped at $180°F$. from the more volatile olefin ethers. The olefin ethers are recycled 8 to reactor 4 for cracking to isoprene and methyl alcohol. Overhead stream 14 containing the crude isoprene is further stripped of methyl chloride in fractionator 16 and of the bulk of the methyl alcohol present in fractionator 18. The methyl alcohol is recycled 20 to a chloromethyl methyl ether synthesis step, not shown. Any methyl alcohol which codistills with the isoprene overhead may be removed by various methods, e.g., using a conventional water scrubbing step, and combined with stream 20 for recycle.

The isoprene product, which contains a percent or so of impurities, may be percolated through a molecular sieve absorber to raise the purity level to 99+percent.

The cracking solvent is recovered from reactor 4 as stream 33 in the form of NMP·HCl dissolved in NMP. Various separation techniques may be employed to recover the solvent for recycle, such as by the method of copending application Ser. No. 725,206, filed Apr. 29, 1968. Stream 22 also contains HCl, tar water, etc. in addition to NMP. Stream 22 is heated in packed column 24 to decompose the NMP·HCl to give an overhead stream 26 containing HCl and water. A portion of bottom stream 28 is steam stripped in column 30 to separate NMP overhead for recycle from the tars formed. Any water present in the NMP overhead stream is preferably split out to purify the NMP for recycle.

As an alternative embodiment, CMBME can be charged to a molecular sieve cracking reactor. Various acidic oxide cracking catalyst systems may be employed, exemplified by SK-500 molecular sieves manufactured by the Norton Company, 10X manufactured by the Union Carbide Corporation, silicon aluminum, bentonite, silica gel, silica-magnesia, natural clays, or various other catalysts on an inert catalyst support. Any of the catalysts described in U.S. Pat. No. 3,360,583 may be employed.

The polyene product, hydrogen halide and alcohol emanating from the pyrolysis reactor may be recovered by any suitable method. It will be appreciated by those skilled in the art that any recovery method suitable for recovery of products from vapor phase type operations may be employed. Suitably, the product vapors may be processed in a water scrubber. The hydrogen halide and alcohol are recovered from the scrub water along with olefin ethers to be recycled to the pyrolysis reactor. Any tertiary alkyl halides produced during pyrolysis may be cracked and recycled according to the method of copending application Ser. No. 861,100. Nonvolatile organic materials, such as excess halo ether-olefin adduct feed may be condensed during the water scrubbing operation and removed as a separate liquid phase and recycled. The volatile components, such as the desired polyene product and the small amounts of alkyl halides formed by the reaction of portions of the hydrogen halide and alcohol may either be condensed in the water scrubber or entrained in a diluent gas such as nitrogen or steam, etc., and condensed in a subsequent receiver.

Other variations and modifications of the invention will become apparent to those skilled in the art upon a reading of the specification and claims and such are to be included within the scope of the invention defined in the specification and appended claims.

What is claimed is:

1. A process for preparing diolefin compounds comprising reacting an alpha halo ether with a reactive olefin to form a halo ether adduct of the olefin, splitting hydrogen halide and alcohol from the halo ether adduct to form a diolefin compound and olefin ethers of the halo ether adduct, recycling at least a portion of said olefin ethers of the halo ether adduct to the splitting step, and recovering the diolefinic compound.

2. A process for preparing conjugated diene compounds comprising reacting an alpha halo ether with a reactive olefin in the presence of an Friedel-Crafts catalyst at temperatures ranging from about −30° to about 70° C. to form a halo ether adduct of the olefin, splitting hydrogen halide and alcohol from the halo ether adduct at temperatures ranging from about 50° to about 500° C. to form polyene and olefin of the halo ether adduct, separating hydrogen halide from the diene and olefin ether of the halo ether adduct, recycling at least a portion of the olefin ether of the halo ether adduct to the splitting step, and recovering the diene substantially as formed.

3. The process of claim 2 wherein the splitting of the halo ether adduct is effected in the presence of a tertiary amide solvent.

4. The process of claim 3 wherein the solvent is N-methyl-2-pyrrolidone.

5. The process of claim 2 wherein the halo ether adduct is split in the presence of an acidic oxide catalyst supported on a fixed bed.

6. The process for the preparation of isoprene comprising reacting chloromethyl methyl ether with isobutylene in the presence of a catalyst at temperatures of from about 0° to about 70° C., to form 3-chloro-3-methylbutyl methylether, splitting isoprene therefrom at from about 50° to about 500° C., and forming olefin ethers of the 3-chloro-3-methylbutyl methylether adduct, recycling the olefin ethers formed to the splitting step for conversion to isoprene and methyl alcohol, and recovering isoprene.

7. The process of claim 6 wherein splitting of the ether is accomplished in the presence of a tertiary amide solvent.

8. The process of claim 7 wherein the solvent is N-methyl-2-pyrrolidone.

9. The process of claim 6 wherein the 3-chloro-3-3-methylbutyl methylether is split in the presence of an acidic oxide containing molecular sieve catalyst.

10. The process of claim 6 wherein the olefin ethers comprise substantially 3-methyl-3-butenyl methylether and 3-methyl-2-butenyl methylether.

PO-1050
(5/69)

UNITED STATES PATENT OFFICE
CERTIFICATE OF CORRECTION

Patent No. 3,607,965          Dated Sept. 21, 1971

Inventor(s) JOHN R. COLEMAN, JR. ET AL

It is certified that error appears in the above-identified patent and that said Letters Patent are hereby corrected as shown below:

| | |
|---|---|
| Col. 1, line 3: | Delete "SUMMARY OF INVENTION" Insert --BACKGROUND OF INVENTION--. |
| Col. 1, line 23: | After "catalyst" insert --such as titanium tetrachloride or zirconium tetrachloride--. |
| Col. 1, line 33: | Delete "$1 \times 10^{110}$" and insert --$1 \times 10^{-10}$--. |
| Col. 1, line 34: | Delete "$10^{111}$" and "$10^{118}$" and insert --$10^{-11}$-- and --$10^{-18}$--. |
| Col. 2, line 2: | Insert --(-- before "CMBME". |
| Col. 4, line 22: | Delete "3-chloro-3-3-methyl" and insert --3-chloro-3-methyl--. |

Signed and sealed this 21st day of March 1972.

(SEAL)
Attest:

EDWARD M. FLETCHER, JR.
Attesting Officer

ROBERT GOTTSCHALK
Commissioner of Patents